United States Patent [19]
Schubart

[11] 3,958,908
[45] May 25, 1976

[54] DEVICE FOR THE PRODUCTION OF CERAMIC MOULDINGS, AND MORE ESPECIALLY OF MAGNETIZED FERRITE MOULDINGS

[75] Inventor: Rolf Schubart, Kochel am See, Germany

[73] Assignee: Dorst-Keramikmaschinen-Bau Inh. Otto Dorst u. Dipl.-Ing. Walter Schlegel, Kochel am See, Germany

[22] Filed: May 23, 1974

[21] Appl. No.: 472,680

[30] Foreign Application Priority Data

June 7, 1973 Germany............................ 2329219

[52] U.S. Cl................................... 425/84; 100/211; 425/352; 425/406; 425/3; 264/86

[51] Int. Cl.[2] ........................ B28B 3/02; B29C 3/00

[58] Field of Search ................ 264/86; 425/84, 406, 425/352, 3; 100/211, 116

[56] References Cited

UNITED STATES PATENTS

| | | | |
|---|---|---|---|
| 2,519,661 | 8/1950 | Johnson | 100/211 X |
| 2,730,281 | 1/1956 | Prohaska | 100/211 X |
| 3,041,153 | 6/1962 | Elder et al. | 425/84 X |

*Primary Examiner*—Robert L. Spicer, Jr.
*Attorney, Agent, or Firm*—Price, Heneveld, Huizenga & Cooper

[57] ABSTRACT

The specification describes an apparatus and a method for the production of ceramic mouldings, in the case of which a suspension of moulding composition particles is introduced into a filling space formed between two punches which can be relatively moved towards each other. The liquid is removed via a filter formed in a punch provided with filter openings. The supply of the suspension is terminated after filling of the filling space with the supply duct shut off. The volume of the system comprising the filling space, the supply duct shut off from the outside and a space with a deformable limiting wall is decreased with a corresponding increase in pressure in this system and then in a conventional manner the final pressure is produced by relative movement of the punches. In the preferred form the filling space is isolated from the remainder of the filling system during the final compaction and forming of the moulding. The invention is preferably applied to the production of magnetized ferrite mouldings.

5 Claims, 1 Drawing Figure

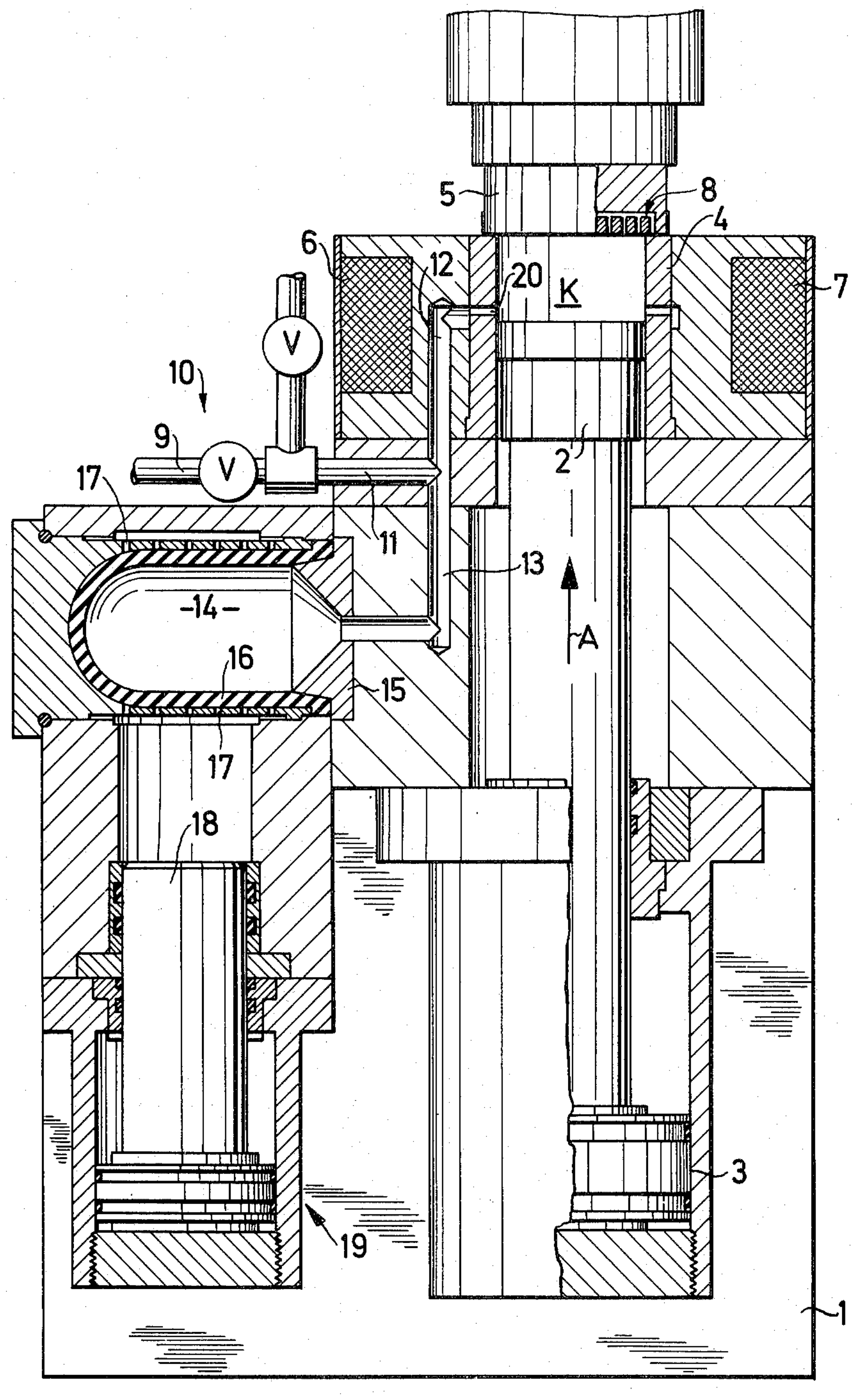
5
8
4
6
7
12
20
K
10
V
9
V
2
17
11
13
-14-
A
16
15
17
18
19
3
1

DEVICE FOR THE PRODUCTION OF CERAMIC MOULDINGS, AND MORE ESPECIALLY OF MAGNETIZED FERRITE MOULDINGS

BACKGROUND OF INVENTION

1. Field to which Invention Relates

The invention relates to the production of ceramic mouldings and is more particularly concerned with the production of magnetized ferrite mouldings.

2. The Prior Art

In the case of a prior art method for the production of magnetized ferrite mouldings the ferrite compositions were ground in suitable mills to particle sizes of approximately 1 micron. During the course of grinding water was added so that an aqueous suspension of the particles was produced. This aqueous suspension was then filled into the dies of presses and the ferrite particles were aligned by magnetic fields. The water was pressed out by the filter provided in the presses and as a filter result the orientated particles were mechanically fixed in the green pressing. After final drying of the green pressings, still containing approximately 6 to 10% of water, the pressings were sintered at temperatures of approximately 1200°C and after cooling were ground down to the finished dimensions.

Since the preliminary filtering out of water during the pressing operation requires a substantial amount of time and furthermore the presses and tools represent expensive and complicated precision machines, there has always been the desire to simplify the presses and also the pressing operation in order to be able to produce such mouldings in a more economic manner. One method of achieving this is by the production of such pressings by so-called, dry pressing methods. In the case of such methods, the desired increase in production speed can be produced, however, the magnetic parameters of the resulting product are substantially worse than in the case of mouldings which are produced in accordance with the wet pressing method.

Since in recent times high requirements have arisen as regards the magnetic quality of such mouldings, it has been necessary as a matter of necessity to revert to the wet pressing method, which is accompanied by the long filtering times already mentioned as being disadvantageous.

In order to be able to achieve high pressing speeds while using the wet pressing method, the practice has already been adopted of filling the die from above with the upper punch raised, moving the upper punch down towards the die, and, by pressing down of the die using the upper punch against a stationary lower punch, pressing out the water through a filter incorporated in the upper punch. It is possible in this manner to mechanically fix the alignment of the particles in the green pressing with approximately 8% residual water.

However, this method as well as operates too slowly. Therefore, attempts have been made to improve the method by the introduction of multiple tools. The saving in working time by the simultaneous pressing of several mouldings, however, leads to substantial difficulties due to the sealing, which becomes necessary as a result, of several punches against the dies. The necessarily high pressing forces in the order of magnitude of 400 kp per sq. centimeter lead to substantial difficulties as regards the maintenance of the seals, since even if only one seal is defective, it automatically follows that all other pressing stations must be made inoperative during the repair.

Therefore, in the case of the manufacture of ceramic mouldings, more particularly of magnetized ferrite mouldings, these methods have been dropped and the practice has been adopted of filling a suspension of moulding composition particles under pressure into a filling space and removing the liquid via a filter formed by a chamber wall provided with filter openings. Since long filling ducts connect the individual pressing station with the closed chamber to allow direct pressure equalisation, individual sealing of the lower punches or rams is no longer necessary. Instead it is only necessary to provide a common or joint seal, which can always be made round, between the central column and the chamber.

In the case of this chamber filling method, however, certain filling times are still required and the removal of water is generally carried out after conclusion of filling and in the actual following pressing operation itself.

A further advance is obtained if the filling is carried out under increased pressure by means of cylinder metering pumps.

In the case of this method, in the production of magnetized ferrite mouldings the magnetic field can be switched on during the process itself and accordingly the ferrite particles can be orientated during the filling. The pressure present during filling makes possible moreover, even during filling itself, at least a partial removal of water and, therefore, a shortening of the pressing operation. It can readily be seen that in employing such a method, the filling devices, more particularly the pumps are subjected to a substantial load and therefore wear very quickly.

SUMMARY OF INVENTION

One aim of the invention is that of providing a method and a device in the case of which the filling can be executed without the use of wear-sensitive cylinder metering and other pumps.

In order to achieve these and other aims the invention proposes a method for the production of ceramic mouldings, and more particularly of magnetized ferrite mouldings, in the case of which a suspension of moulding composition particles is introduced into a filling space formed between two punches which can be relatively moved towards each other and the liquid is removed via a filter formed in a punch provided with filter openings, characterised in that the supply of the suspension is terminated after filling of the filling space, and with the supply duct shut off, the volume of the system comprising the filling space, the portion of supply duct shut off from the outside, a space with a deformable limiting wall is decreased in volume with a corresponding increase in pressure in this system and then in a conventional manner the final pressure is produced by relative movement of the punches.

The invention also consists in an apparatus for carrying out this method comprising in a conventional manner a filling space formed between two relatively movable punches adapted to be moved together, means defining filter openings in at least one punch and a pump adapted to fill the filling space with a suspension of moulding composition particles via a supply duct, characterised in that the filling space is connected with a space having at least one deformable limiting wall, the supply duct is provided with an arbitarily actuable closing part and a pressure amplifying device is provided with which after the closing of the closing part the content of the system comprising the filling space, the portion of the supply duct shut off from the outside and the space with at least one deformable limiting wall can be placed under pressure via the deformable limiting wall.

Preferably, the deformable limiting wall is accommodated in a high pressure body, which is connected with a cylinder piston unit adapted to be acted upon by a pressure medium and this unit makes it possible to place under pressure the deformable limiting wall after the closing of the closing part and therefore the content of the system comprising the filling space and the portion of the supply duct off from the outside.

The opening of the supply duct into the filling space is, in accordance with a further development of the invention, preferably so constructed that the punch as it is moved for producing the final pressure passes over the opening during this movement and thus isolates all of the system except the filled chamber from the final pressure. Accordingly, the filling pump, the shut off valves, the supply duct and the unit with the deformable wall are protected against damage by this final pressure.

If it is desired to produce magnetized ferrite mouldings, the magnet coils are preferably arranged around and adjacent to the filling space in such a manner that magnetizing direction or orientation predominates which represents the optimum alignment or direction for the respective moulding.

DESCRIPTION OF PREFERRED EMBODIMENT

The accompanying drawing shows, in a single FIGURE, a diagrammatic representation of a simple embodiment of a device in accordance with the invention.

In the machine frame 1 the movable lower punch 2 is guided and can be moved via the piston 3 towards the upper punch 5 which can be mounted on the die 4. The lower punch 2 and the upper punch 5 together with the die 4 define a filling space K around which the magnetizing coil 6, 7 is placed. In the upper punch 5 a system 8 of holes and channels is provided via which the fluid part of the suspension filled into the filling space K can escape from the filling space. The suspension is introduced into the filling space K via the duct 9, the closing part 10 or cock and the duct 11 by means of a pump not shown. The duct 11 opens into a branch duct 12 which leads to the filling space K and into a branch 13 which is connected with the space 14.

This space 14 is limited on one side by the solid wall 15, into which the branch duct 13 opens and on the other hand it is limited by a membrane 16, which can be put under pressure via the small openings 17. This placing under pressure is carried out by means of a pressure medium or fluid, which is located above the piston 18 of a cylinder piston unit 19, which can be placed under pressure from the outside or external means.

After the pump, which is not shown, has filled the system comprising the filling space K and the space 14 with the suspension via the duct 9, the cock 10 and the duct 11 with its two branch ducts 12 and 13, the valve or cock 10 is shut and the piston cylinder unit 19 is placed under pressure so that the content of the space 14 is displaced via the branch ducts 13 and 12 into the filling space K. In the filling space K the liquid part of the suspension now escapes via the system 8 of holes and channels into drainage ducts which are not especially shown. When the desired final state of compression or compaction has been achieved, the lower punch 2 is put in motion in an upward direction, as indicated by arrow A, by action of the punch piston 3. During this motion, the lower punch 2 passes over the opening 20 of the supply branch duct 12 and, thus, firstly closes the whole filling system isolating it from the filling space K so that on the application of the final pressure it cannot be damaged. Then, on further movement of the lower punch 2 the final compaction or compression of the filling in the filling space K is undertaken. The coil 6, 7 can be energized during the whole operation so that during the whole operation a magnetic field exists in accordance with which the magnetizable particles comprised in the suspension can be aligned.

It can thus be seen that the supply pump connected with the duct 9 only needs to pump the suspension with sufficient pressure to fill the filling space without placing the suspension in the filling space under such high pressure that it leads to at least a partial removal of water. This removal of water is, instead, carried out only after closing of the closing part or cock 10 and therefore with complete elimination of the load from the filling pump since the space 14 is placed under pressure by entirely separate means.

One aim of the invention, that is of providing a method and a device such that devices which are not subject to wear to any pronounced extent can be used for applying a pressure sufficient for substantial removal of water is therefore achieved fully.

If for technical reasons connected with the press construction it should be convenient to operate in a drawing down procedure, that is to say with a movable die and a stationary low punch, the principle of the filling or charging procedure is not changed in any way. The only difference consists in that the closing of the filling opening in the pressing tool is carried out by the downward movement of the die below the upper edge of the stationary upper punch.

The embodiments of the invention in which an exclusive property or privilege is claimed are defined as follows:

1. An apparatus for forming ceramic moulding from a suspension of mouldable solids in liquid, said apparatus has a die with a liquid permeable wall and a movable punch forming a moulding cavity and means including a conduit and an external source for supplying the suspension to said cavity, the improvement in said apparatus comprising: a surge chamber having a movable wall connected to said conduit and means operatively connected to said surge chamber for moving said wall, a valve for isolating said moulding cavity and surge chamber from said external source whereby when said moulding cavity and surge chamber are full, upon closing said valve said means may be activated to move said movable wall to pressurize the contents of said surge chamber and moulding cavity.

2. The apparatus described in claim 10 wherein said conduit communicates with said moulding chamber through a port adjacent said movable punch, said punch during its initial movement toward said die passing over and closing said port to isolate said moulding chamber from said conduit and surge chamber.

3. An apparatus for the production of mouldings from a suspension of mouldable composition particles, said apparatus having a filling space formed between two punches, at least one of which is movable for changing the volume of said filling space, means defining filter openings in at least one punch and a pump adapted to fill the filling space with the suspension of moulding composition particles via a supply duct, said apparatus characterized in that the filling space is connected with a space having at least one deformable limiting wall, said supply duct being provided with an arbitrarily actuable closing part and with a pressure amplifying device; said pressure amplifying device after the closing of the closing part by means of the deformable wall placing under pressure the contents of the filling space.

4. An apparatus in accordance with claim 3, further characterized in that the deformable limiting wall is accommodated in a high pressure body, a pressure medium actuated cylinder piston unit for applying deforming pressure to the deformable limiting wall after the closing of the closing part.

5. An apparatus in accordance with claim 3 further characterized that one of the punches moves past said supply duct during the application of the final pressure pass for shutting off the supply duct during application of the final pressure.

* * * * *

UNITED STATES PATENT AND TRADEMARK OFFICE

CERTIFICATE OF CORRECTION

PATENT NO. : 3,958,908

DATED : May 25, 1976

INVENTOR(S) : Rolf Schubart

It is certified that error appears in the above-identified patent and that said Letters Patent are hereby corrected as shown below:

Col. 1, line 58;
"as", second occurrence, should read -- also --.

Col. 4, line 58;
"10" should be --- 1 ---.

Signed and Sealed this

Fourteenth Day of December 1976

[SEAL]

*Attest:*

RUTH C. MASON
*Attesting Officer*

C. MARSHALL DANN
*Commissioner of Patents and Trademarks*